United States Patent
Sartori et al.

(10) Patent No.: US 10,849,043 B2
(45) Date of Patent: Nov. 24, 2020

(54) AUTOMATIC ASSOCIATION OF PEER NETWORK SLICES FOR ENABLING CROSS-OPERATOR INTER-SLICE HANDOVER

(71) Applicant: Nokia Solutions and Networks Oy, Espoo (FI)

(72) Inventors: Cinzia Sartori, Pullach (DE); Ahmad Awada, Munich (DE); Christian Mannweiler, Munich (DE)

(73) Assignee: Nokia Solutions and Networks Oy, Espoo (FI)

(*) Notice: Subject to any disclaimer, the term of this patent is extended or adjusted under 35 U.S.C. 154(b) by 15 days.

(21) Appl. No.: 16/526,707

(22) Filed: Jul. 30, 2019

(65) Prior Publication Data
US 2020/0053619 A1 Feb. 13, 2020

Related U.S. Application Data
(63) Continuation of application No. 62/716,432, filed on Aug. 9, 2018.

(51) Int. Cl.
| | | |
|---|---|---|
| H04W 36/00 | (2009.01) | |
| H04W 36/30 | (2009.01) | |
| H04W 36/08 | (2009.01) | |
| H04W 8/08 | (2009.01) | |

(Continued)

(52) U.S. Cl.
CPC ............ *H04W 36/30* (2013.01); *H04W 8/08* (2013.01); *H04W 36/08* (2013.01); *H04W 48/18* (2013.01); *H04W 84/042* (2013.01)

(58) Field of Classification Search
None
See application file for complete search history.

(56) References Cited

U.S. PATENT DOCUMENTS

2018/0352592 A1* 12/2018 Zhu .................. H04L 5/0053

FOREIGN PATENT DOCUMENTS

| WO | 2017/171598 A1 | 10/2017 | |
| WO | WO-2017171598 A1 * | 10/2017 | ........ H04W 36/0061 |

OTHER PUBLICATIONS

"3rd Generation Partnership Project; Technical Specification Group Services and System Aspects; Study on Communication for Automation in Vertical Domains (Release 16)", 3GPP TR 22.804, V16.0.0, Jun. 2018, pp. 1-189.

(Continued)

*Primary Examiner* — Ayanah S George
(74) *Attorney, Agent, or Firm* — Nokia Technologies Oy

(57) ABSTRACT

In accordance with an example embodiment of the present invention, a method comprising: receiving, by a device of a first communication network, a list of single network slice selection assistance information (S-NSSAI), wherein the list of S-NSSAI comprises characteristics of each network slice supported by a second communication network; selecting, by the device of the first communication network, at least one network slice of the first communication network based at least on the characteristics; associating, by the device of the first communication network, the selected at least one network slice of the first communication network with at least one network slice of the second communication network; and indicating the association to a device of the second communication network.

20 Claims, 13 Drawing Sheets

(51) Int. Cl.
*H04W 48/18* (2009.01)
*H04W 84/04* (2009.01)

(56) References Cited

OTHER PUBLICATIONS

"3rd Generation Partnership Project; Technical Specification Group Radio Access Network; NG-RAN; Xn application protocol (XnAP) (Release 15)", 3GPP TS 38.423, V15.0.0, Jun. 2018, pp. 1-195.
"New SID on Enhanced support of Vertical and LAN Services", SA WG2 meeting #S2-127bis, S2-186182, Agenda: 7.1, Nokia, May 28-Jun. 1, 2018, 3 pages.
"3rd Generation Partnership Project; Technical Specification Group Radio Access Network; NG-RAN; NG Application Protocol (NGAP) (Release 15)", 3GPP TS 38.413, V15.0.0, Jun. 2018, pp. 1-264.

\* cited by examiner

| IE/Group Name | Presence | Range | IE type and reference | Semantics description | Criticality | Assigned Criticality |
|---|---|---|---|---|---|---|
| TAI Support Item IEs | | 1..<maxnoofsupportedTACs> | | | EACH | reject |
| >TAC | M | | 9.2.2.5 | Broadcast TAC | -- | |
| >Broadcast PLMNs | | 1..<maxnoofsupportedPLMNs> | | | -- | |
| >>PLMN Identity | M | | 9.2.2.4 | Broadcast PLMN | -- | |
| >>TAI Slice Support List | O | | Slice Support List 9.2.3.22 | Supported S-NSSAIs per TA | -- | |

FIG. 7

| IE/Group Name | Presence | Range | IE type and reference | Semantics description |
|---|---|---|---|---|
| Slice Support Item IEs | | 1..<maxnoof SliceItems> | | |
| >S-NSSAI | M | | 9.2.3.21 | |
| >S-NSSAI characteristics | O | | | List of key slice characteristics: e.g. 5QI, reliability-level, availability level, MEC, etc |
| >List of peer S-NSSAIs | O | | | List of peer S-NSSAI(s) sent in the Xn Setup Response/Configuration Update Acknowledge |

810

| IE/Group Name | Presence | Range | IE type and reference | Semantics description | Criticality | Assigned Criticality |
|---|---|---|---|---|---|---|
| PDU Session Resources To Be Setup List | | 1 | | | YES | reject |
| >PDU Session Resources To Be Setup Item IEs | | 1 .. <maxno of PDU sessions> | | | EACH | reject |
| >>PDU Session ID | M | | 9.2.3.18 | | – | |
| >>S-NSSAI | M | | 9.2.3.21 | | – | |
| >>source S-NSSAI | M | | 9.3.1.21 | | | |
| >>target S-NSSAI | O | | 9.3.1.21 | | | |
| >>PDU Session Resource Aggregate Maximum Bitrate | M | | OCTET STRING | This IE may need to be refined. | – | |
| >>UL NG-U UP TNL Information at UPF | M | | UP Transport Layer Information 9.2.3.30 | UPF endpoint of the NG-U transport bearer. For delivery of UL PDUs | – | |
| >>Security Indication | O | | 9.2.3.52 | | – | |
| >>PDU Session Type | M | | 9.2.3.19 | | – | |
| >>QoS Flows To Be Setup List | | 1 | | | – | |
| >>>QoS Flows To Be Setup Item IEs | | 1 .. <maxno of QoS Flows> | | | EACH | reject |
| >>>>QoS Flow Indicator | M | | 9.2.3.10 | | – | |
| >>>>DL data Forwarding | O | | 9.2.3.34 | | – | |
| >>>>QoS Flow Level QoS Parameters | M | | 9.2.3.5 | | – | |
| >>>>E-RAB ID | O | | INTEGER (0..15, ...) | | – | |
| >>Source DRB to QoS Flow Mapping List | O | | DRB to QoS Flow Mapping List 9.2.1.15 | | – | |

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| Handover Type | M | | 9.3.1.22 | | YES | reject |
| Cause | M | | 9.3.1.2 | | YES | ignore |
| Target ID | M | | 9.3.1.25 | | YES | reject |
| Direct Forwarding Path Availability | O | | 9.3.1.64 | | YES | ignore |
| PDU Session Resource List | | 1 | | | YES | reject |
| >PDU Session Resource Item IEs | | 1..<maxno ofPDUSes sions> | | | EACH | reject |
| >>PDU Session ID | M | | 9.3.1.50 | | - | |
| >><s>>S-NSSAI</s> | <s>M</s> | | <s>9.3.1.24</s> | | - | |
| >><s>source S-NSSAI</s> | <s>M</s> | | <s>9.3.1.24</s> | | - | |
| >><s>target S-NSSAI</s> | <s>O</s> | | <s>9.3.1.24</s> | | - | |
| >>Handover Required Transfer | M | | OCTET STRING | Containing the *PDU Session Resource Setup Request Transfer* IE specified in subclause 9.3.4.1. | - | |
| >>PDU Session Resource Subject to Handover | M | | OCTET STRING | This IE may need to be refined | - | |
| Source to Target Transparent Container | M | | 9.3.1.20 | | YES | reject |

FIG. 10

| PDU Session Resource Setup List | | 1 | | | YES | reject |
|---|---|---|---|---|---|---|
| >PDU Session Resource Setup Item IEs | | 1..<maxno ofPDUSes sions> | | | EACH | reject |
| >>PDU Session ID | M | | 9.3.1.50 | | - | |
| >>S-NSSAI | M | | 9.3.1.24 | | - | |
| >>source S-NSSAI | M | | 9.3.1.24 | | - | |
| >>target S-NSSAI | O | | 9.3.1.24 | | | |
| >>Handover Request Transfer | M | | OCTET STRING | Containing the PDU Session Resource Setup Request Transfer IE specified in subclause 9.3.4.1. | - | |
| Trace Activation | O | | 9.3.1.14 | | YES | ignore |
| Masked IMEISV | O | | 9.3.1.54 | | YES | ignore |
| Source to Target Transparent Container | M | | 9.3.1.20 | | YES | reject |
| Mobility Restriction List | O | | 9.3.1.85 | | YES | ignore |
| Location Reporting Request Type | O | | 9.3.1.65 | | YES | ignore |

AUTOMATIC ASSOCIATION OF PEER NETWORK SLICES FOR ENABLING CROSS-OPERATOR INTER-SLICE HANDOVER

TECHNICAL FIELD

The teachings in accordance with the example embodiments of this invention relate generally to a procedure for the building and alignment of 'peer S-NSSAIs' associations and, more specifically, relate to an automatic procedure for building and alignment of 'peer S-NSSAIs' associations such as across different PLMNs or between a PLMN and a type-a network.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
5QI 5G QoS indicator
AKA authentication and key agreement
AMF access management function
e2e end-to-end
ePDG evolved packet data gateway
ID identification
IE information element
IW interworking
IWF interworking function
LBO local break out
MEC multi-access edge computing
MNO mobile network operator
MSO multi-service operator
N3IWF non-3GPP interworking function
NG-RAN next generation radio access network
NSSAI network slice selection assistance information
PLMN public land mobile network
PLMN ID public land mobile network identifier
PDU packet data unit
QoS quality of service
RAN radio access network
S-NSSAI single network slice selection assistance information
TAI tracking area identity
UDM unified data management
UPF user plane function
Xn
XnAP Xn application protocol Network Slicing (NS) is one essential mechanism for newer radio technology networks such as 5G networks to serve vertical industries with different service requirements, in term of at least latency, reliability, capacity, and domain specific extra functionalities. Network slicing is intended to provide end-to-end logical networks for tenants with different services requirements. Also there is seen to be a requirement to enable management of independent network slicing operations in entity networks such as by vertical industry and enterprise network operators.

Example embodiments of the invention as described herein address at least these requirements.

SUMMARY

Various aspects of examples of the invention are set out in the claims.

According to a first aspect of the present invention, a method comprising: receiving, by a device of a first communication network, a list of single network slice selection assistance information (S-NSSAI), wherein the list of S-NSSAI comprises characteristics of each network slice supported by a second communication network; selecting, by the device of the first communication network, at least one network slice of the first communication network based at least on the characteristics; associating, by the device of the first communication network, the selected at least one network slice of the first communication network with at least one network slice of the second communication network; and indicating the association to a device of the second communication network.

According to a second aspect of the present invention, an apparatus of a first communication network comprising: at least one processor; and at least one memory including computer program code, wherein the at least one memory and the computer program code are configured, with the at least one processor, to cause the apparatus to at least: receive a list of single network slice selection assistance information (S-NSSAI), wherein the list of S-NSSAI comprises characteristics of each network slice supported by a second communication network; select at least one network slice of the first communication network based at least on the characteristics; associate the selected at least one network slice of the first communication network with at least one network slice of the second communication network; and indicate the association to a device of the second communication network.

According to a third aspect of the present invention, A non-transitory computer storage medium encoded with a computer program, the program comprising instructions that when executed by one or more computers cause the one or more computers to perform operations comprising: receiving, by a device of a first communication network, a list of single network slice selection assistance information (S-NSSAI), wherein the list of S-NSSAI comprises characteristics of each network slice supported by a second communication network; selecting, by the device of the first communication network, at least one network slice of the first communication network based at least on the characteristics; associating, by the device of the first communication network, the selected at least one network slice of the first communication network with at least one network slice of the second communication network; and indicating the association to a device of the second communication network.

According to a fourth aspect of the present invention, a method comprising: sending, by a device of a second communication network, a list of single network slice selection assistance information (S-NSSAI), wherein the list of S-NSSAI comprises characteristics of each network slice supported by the second communication network; and receiving an association of at least one network slice of a first communication network with at least one network slice of the second communication network, wherein the at least one network slice of the second communication network is in the list of S-NSSAI sent by the device.

According to a fifth aspect of the present invention, an apparatus comprising: at least one processor; and at least one memory including computer program code, wherein the at least one memory and the computer program code are configured, with the at least one processor, to cause the apparatus to at least: send a list of single network slice selection assistance information (S-NSSAI), wherein the list of S-NSSAI comprises characteristics of each network slice supported by the second communication network; and receive an association of at least one network slice of a first communication network with at least one network slice of the second communication network, wherein the at least one network slice of the second communication network is in the list of S-NSSAI sent by the apparatus.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 7 shows a Table including a 'TAI Support List' indicating the supported S-NSSAIs for each tracking identity (TAI);

FIG. 9 shows a Table including proposed modifications to 'PDU Session Resources To Be Setup Item' IE in accordance with example embodiments of the invention;

FIG. 10 shows a Table including proposed modifications to 'PDU Session Resource Setup List' contained in HANDOVER REQUIRED message in accordance with example embodiments of the invention;

FIG. 11 shows a Table including proposed modifications to 'PDU Session Resource Setup List' contained in HANDOVER REQUEST message in accordance with example embodiments of the invention.

DETAILED DESCRIPTION

In this invention, we propose an automatic procedure for building and alignment of 'peer S-NSSAIs' associations such as across different PLMNs or between a PLMN and a type-a network.

Network slicing is providing e2e logical networks for different services and tenants and it is specified in 3GPP Rel.15. Further, Rel.16, SA1 TR 22.804 [TR 22.804] introduces many use cases and requirements for verticals and classifies networks for 'non-public use' as type-a and type-b networks, formerly called exclusive and private networks.

It is noted that the following definitions have been agreed to:

A Type-a network is defined as a 3GPP network that is not for public use and for which service continuity and roaming with a Public Land Mobile Network (PLMN) is possible.

A Type-b network is defined as an isolated 3GPP network that does not interact with a PLMN.

Further, according to 3GPP TR 22.804 V16.0.0 (2018-06) 5G systems shall support private operation by deploying type-a network or type-b network within a factory or plant, which are isolated from PLMNs. This is required by many factory/plant owners for security, liability, availability and business reasons. Nevertheless, in the case of a type-a network is deployed flexible interfaces shall be supported for seamless interoperability and seamless handovers between 5G PLMNs and private 5G systems.

Example embodiments of the invention consider a use case of an enterprise that deploys a type-a network which can have some interactions with the Mobile Network Operator (MNO) public network. According to the definition, a type-a network has its own network identifier (PLMN, PLMN+xxx, other IDs) which is different from that of an MNO public network. The users of a type-a enterprise network are allowed to roam, and require service continuity when moving between the enterprise network and the MNO PLMN (note: this is only relevant for subscribers of the enterprise network, PLMN subscribers cannot roam and connect to the enterprise network). The service continuity for the enterprise subscribers can be ensured by performing an inter-PLMN handover toward the MNO network, for instance. Existence of neighbor relations between PLMN and enterprise network cells is a pre-requisite for such service continuity.

Figure 1:
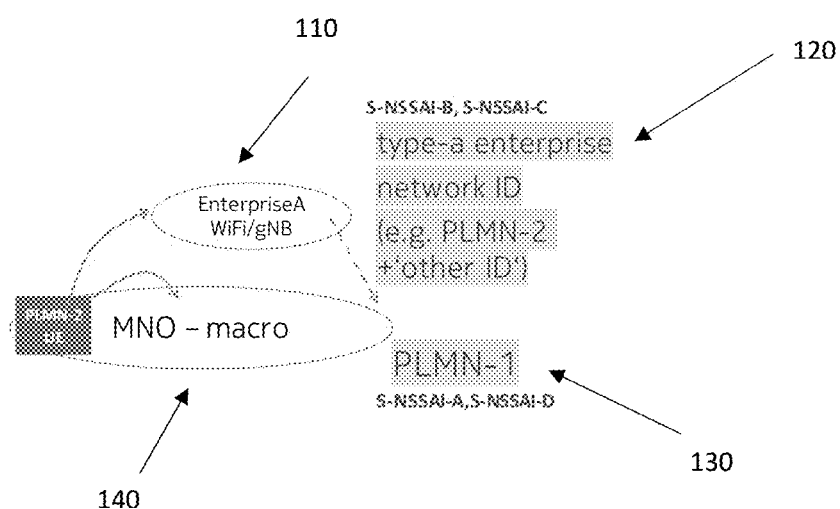
FIG. 1 shows an enterprise with different public land mobile networks.

FIG. 1 shows an enterprise 110 with a limited coverage having own network identifier, e.g. PLMN2+ 'other ID' 120 that is different from PLMN 1 130 of an MNO network 140. Different groups of users can be identified by one or more network slices in each PLMN. From deployment point of view, the enterprise has a limited coverage (i.e. the campus area of the enterprise 110 as shown in FIG. 1) and has different groups of users, each with different access and mobility requirements. For example: devices/machines don't move outside the campus area. Another group of users can instead move outside the campus area, e.g. smart phones or goods carried by trucks that need to be delivered in whole country. Some UEs require service continuity. Each group can be identified by one or more network slices (i.e., the respective Single-Network Slice Selection Assistance Information (S-NSSAI)).

The vertical industries/enterprises require an independent management of their own network: That is, they want to control/manage it, configure their own subscribers and data without any interaction with the MNO.

In this context the enterprise and the MNO partnership is very similar to the roaming scenario between two MNOs, where the same problem exists. In fact, in 5G the MNO and its roaming partners need to agree beforehand not only on the PLMN values (this is relatively simple because of the limited range of PLMN values and since those PLMN associations are occasionally changed) but also the corresponding home and visited S-NSSAIs.

Example embodiments of the invention address the case of interaction between the enterprise network (type-a network) and the MNO PLMN, but the same can be applied between different MNOs. The enterprise may set 'proprietary/non-standardized' S-NSSAIs values, assigned based on e.g. service type, user priority, or other criteria. Being allocated independently, the enterprise and the MNO can use different S-NSSAI values for the same services.

Problem 1: This concerns the process of aligning 'non-standard S-NSSAIs', e.g., between network operators of (1) an enterprise and MNO, or (2) different MNOs.

Manual or configuration-based alignment of S-NSSAI values may lead to a complicated and inefficient procedure that needs 'frequent' updating between MNOs or between MNO and verticals, particularly if vertical enterprises want to deploy a type-a network and configure/manage their network independently from the operators as much as possible. The consequent problem is call drop (service discontinuity, in general) if the S-NSSAIs are misaligned/misconfigured in the two NG-RAN nodes.

This problem will become more eminent for the enterprise type-a network as well as for MNOs when the number of slices will, in the future, increase to a very large number (potentially hundreds/thousands beyond 202×).

Problem 2: For supporting service continuity, handover between different slices/S-NSSAIs needs to be supported. This is currently not allowed in Rel.15.

Rel.15 assumes that the set of supported slices is uniform in each Tracking Area. When a UE moves in a new Tracking Area that doesn't support a given S-NSSAI the UE is currently connected to, the call/PDU session is dropped (The assumption in Rel.15 was that the S-NSSAI value would only be configured in the areas where it would be required.). For such a case, [TS38.423], clause 8.2.1 about XnAP basic mobility procedures, more specifically 'Handover preparation', states:

'If the HANDOVER REQUEST [from source NG-RAN node to target NG-RAN node] includes PDU session resources for PDU sessions associated to S-NSSAIs not supported by target NG-RAN, the target NG-RAN shall reject such PDU session resources. In this case, and if at least one PDU Session Resource To Be Setup Item IE is admitted, the target NG-RAN shall send the HANDOVER REQUEST ACKNOWLEDGE message including the PDU Session Resources Not Admitted List IE listing corresponding PDU sessions rejected at the target NG-RAN'.

However some services require service continuity when moving between MNO and type-a network registration areas. ((Each registration area) supports different list of slices (S-NSSAIs).

It is noted that neither type-a nor type-b networks are defined before Rel.16. Rather, they are introduced and described in Rel.16 SA1 TR 22.804 [TR 22.804]. Mobility and session continuity between the enterprise-type-a network and the MNO public network shall be supported for enterprise-UEs. In SA2, SID 'Support for Vertical and LAN Services' [S2-186182] has been approved.

Problem 1: The correspondence of S-NSSAIs between MNOs (e.g., for roaming purpose) and between MNO and enterprise must be 'manually' set in the Unified Data Management (UDM), i.e., no automatic procedure is defined [TS 38.423].

Moreover, previous proposals related to handover in a wireless communication network with network slices, define mechanisms for handover in a wireless communication network with network slices. Such as defining a mechanism for handling mobility of a wireless device in a communication network with partitioned sets of functionalities (i.e., network slices).

While these proposals may cover a problem of S-NSSAIs correspondence between networks (refer to 'Problem 1' above), these prior proposals are limited to a manual configuration-based approach which example embodiments of the invention aim to overcome, i.e., no automatic procedure is defined. Thus, at least problem 2 as described below is not covered at all.

Figure 3:
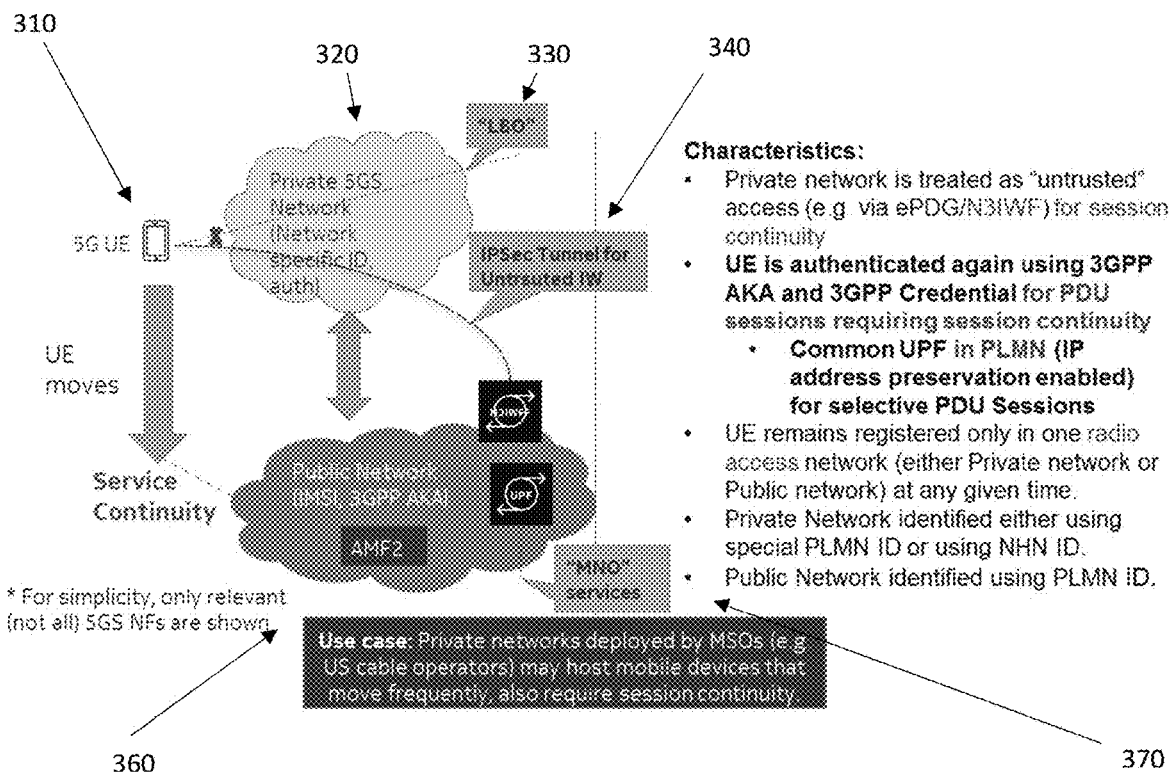
FIG. 3 shows architecture and procedures used for untrusted access for a single registration.
Figure 4:
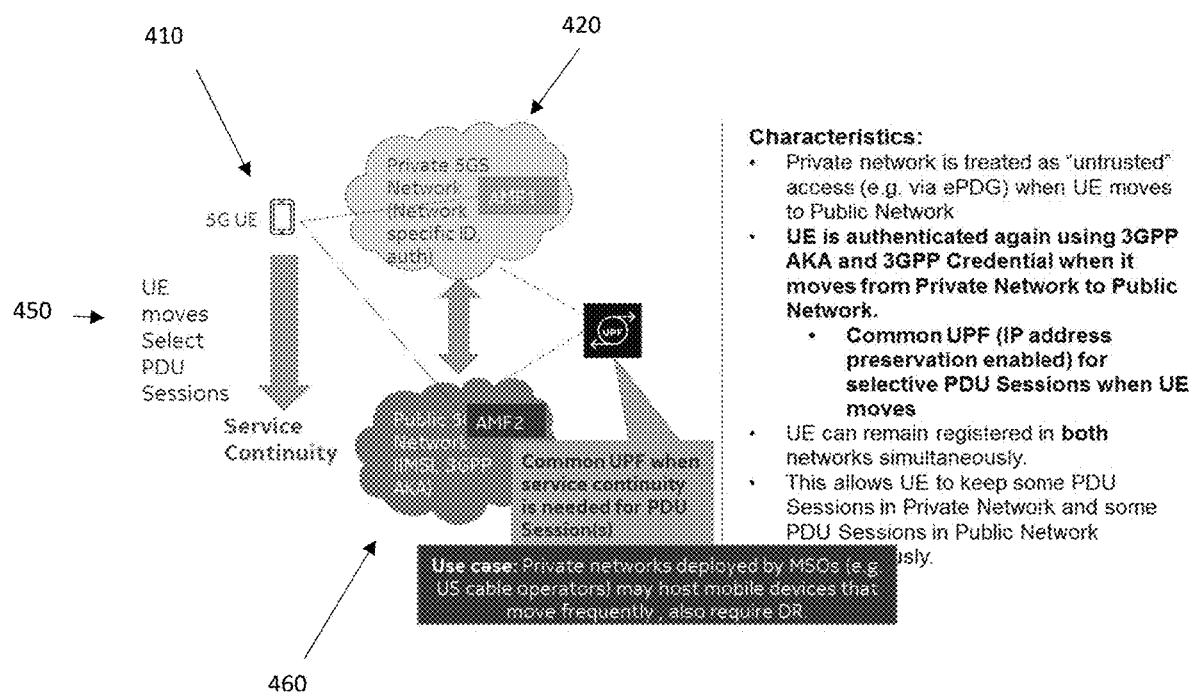
FIG. 4 shows architecture and procedures used for untrusted access for a dual registration.

Problem 2: One key component for service continuity is IP address preservation, that can be achieved with the architecture and procedures used for untrusted access, as shown in FIG. 3 and FIG. 4 for a single and dual registration respectively. However, IP address preservation is a necessary but not sufficient condition for service continuity, handover needs to be supported as well.

In an inter-PLMN scenario, which is the case of the type-a network, inter-slice handover is not supported in Rel.15, not even for the intra-PLMN case.

FIG. 3 shows IP address preservation in untrusted access, case of UE supporting single registration. As shown in FIG. 3 there is a 5G UE 310 with a local break out LBO 330 from the private (5GS) network 320 and an IPSec tunnel 340 for untrusted IW to public network 360. MNO services 370 are performed with the public network 360. The private 5GS network 320 is deployed by MSOs.

Here, characteristics include:
the private network 320 is treated as "untrusted" access (e.g., via ePDG/N3IWF) for session continuity;
The UE 310 is authenticated again using 3GPP ASA and 3GPP credential for PDU sessions requiring session continuity:
Common UPF in PLMN (IP address preservation enabled) for selective PDU sessions;
UE 310 remains registered only in one radio access network (either private network 320 or public network 360) at any given time;
Private network identified either using special PLMN ID or NHN ID; and
Public network 360 identified using PLMN ID.

In one use case private networks deployed by MSOs (e.g., U.S. Cable operators) may host mobile devices that move frequently, and also require session continuity FIG. 4 shows an IP address preservation in untrusted access for a case of UE 410 supporting dual registration. As shown in FIG. 4 there is a 5G UE 410 with Access Mobility Management Function 1 (AMF1) to the private 5GS network 420, and an Access Mobility Management Function 2 (AMF2) to the public 5G network 460. As shown in FIG. 4 the UE 410 moves select PDU sessions from the private network 420 to the public network 460.

Here, characteristics include:
the private network 420 is treated as "untrusted" access (e.g., via ePDG) when the UE 410 moves to the public network 460;
The UE 410 is authenticated again using 3GPP ASA and 3GPP credential when it moves from private network 420 to the public network 460:
Common UPF in PLMN (IP address preservation enabled) for selective PDU sessions when UE 410 moves;
UE 310 can remain registered in both the private network 420 and the public network 460 simultaneously; and
This allows the UE to keep some PDU sessions in private network 420 and some PDU sessions in public network 460 simultaneously.

One example embodiment of the invention relates to the introduction of an automatic procedure for building the association between 'peer S-NSSAIs' across different PLMNs or between a PLMN and a type-a network. Another example embodiment of the invention enables inter-slice handover procedures.

Figure 2:
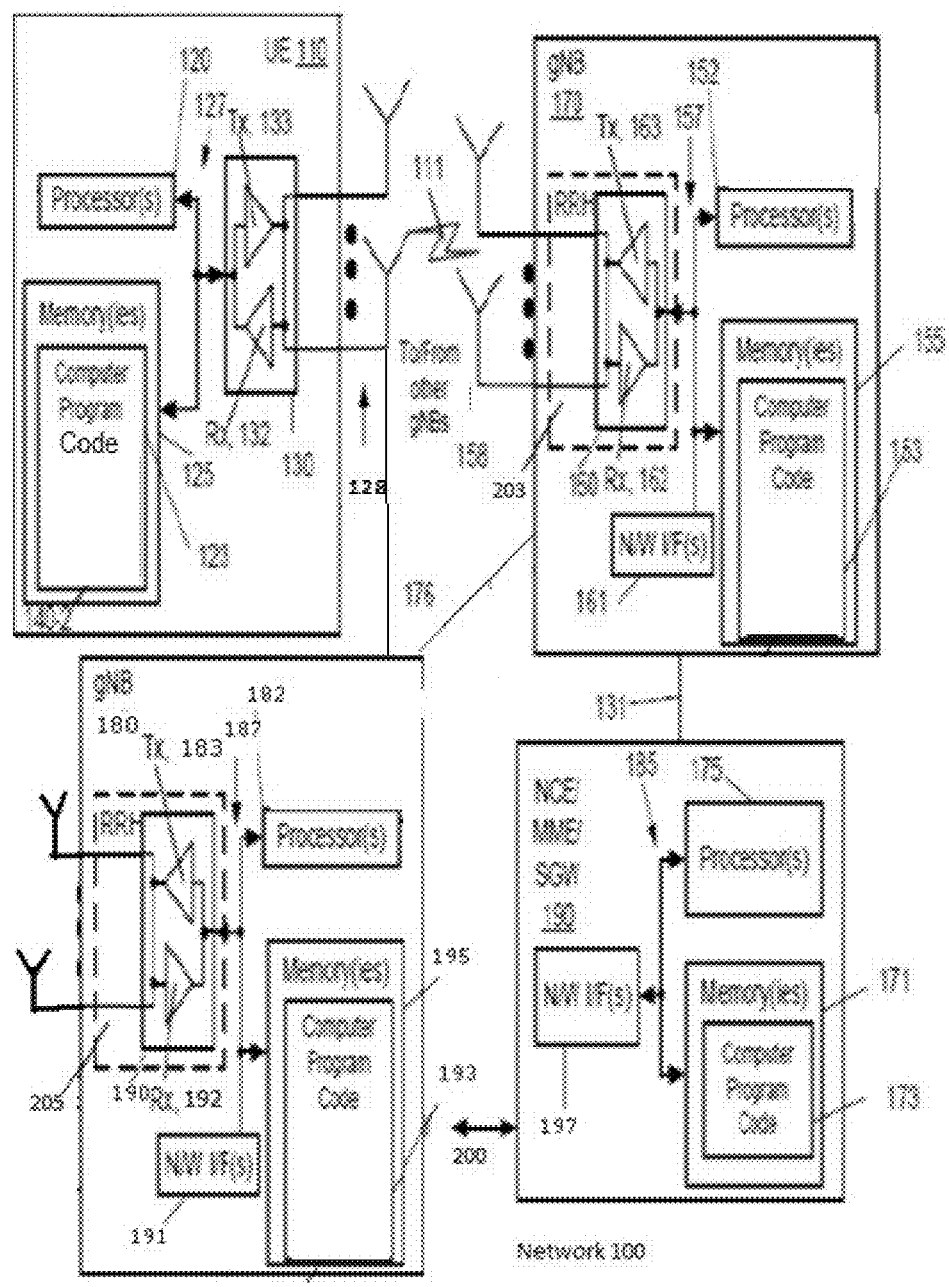
FIG. 2 shows a high level block diagram of various devices used in carrying out various aspects of the invention.

Before describing the example embodiments of the invention in further detail, reference is made to FIG. 2 for illustrating a simplified block diagram of various electronic devices that are suitable for use in practicing the example embodiments of this invention. FIG. 2 shows a block diagram of one possible and non-limiting exemplary system in which the example embodiments of the invention may be practiced. In FIG. 2, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more transceivers 130 have multi-connectivity configurations and communicate over the wireless network 100 or any other network. The one or more memories 125 include computer program code 123 executed by the one or more processors 120. The one or more processors 120 may be implemented also as an integrated circuit or through other hardware such as a programmable gate array. For instance, the one or more memories 125 and the computer program code 123 may be configured, with the one or more processors 120, to cause the user equipment 110 to perform one or more of the operations as described herein. The UE 110 communicates with gNB 170 and the gNB 180 via a wireless link 111.

The gNB 170 (NR/5G Node B or possibly an evolved NB) is a base station such as a secondary node base station (e.g., for NR or LTE long term evolution) that communicates with devices such as gNB 180 and UE 110 of FIG. 2. The gNB 170 provides access to wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153 executed by the one or more processors 152. The one or more processors 152 may be implemented also as an integrated circuit or through other hardware such as a programmable gate array. The one or more memories 155 and the computer program code 153 are configured to cause, with the one or more processors 152, the gNB 170 to perform one or more of the operations as described herein. The one or more network interfaces 161 and 191 and the one or more transceivers 160 that have multi-connectivity configurations and communicate over the wireless network 100 or any other network. Such communication can be between the gNB 170, the gNB 180, and the UE 110 via the links 176 and 111. In addition, two or more gNB 170 may communicate with another gNB or eNB using, e.g., links 176. The links 176 may be wired or wireless or both and may implement, e.g., an X2 interface. Further the links 176 may be through other network devices such as, but not limited to an NCE/MME/SGW device such as the NCE/MME/SGW 190 of FIG. 2.

The gNB 180 (NR/5G Node B or possibly an evolved NB) is a base station such as a master node base station (e.g., for NR or LTE long term evolution) that communicates with devices such as the gNB 170 and/or UE 110 and/or the wireless network 100. The gNB 180 includes one or more processors 182, one or more memories 195, one or more network interfaces (N/W I/F(s)) 191, and one or more transceivers 190 interconnected through one or more buses 187. Each of the one or more transceivers 190 includes a receiver Rx 192 and a transmitter Tx 183. The one or more transceivers 190 are connected to one or more antennas 185. The one or more transceivers 190 have multi-connectivity configurations and communicate over the wireless network 100 or any other network. The one or more memories 195 include computer program code 193 executed by the one or more processors 182. The one or more processors 182 may be implemented also as an integrated circuit or through other hardware such as a programmable gate array. The one or more memories 155 and the computer program code 153 are configured to cause, with the one or more processors 182, the gNB 180 to perform one or more of the operations as described herein. The one or more network interfaces 181 communicate over a network such as via the links 176. Two or more gNB 170 or gNB 180 may communicate with another gNB and/or eNB or any other device using, e.g., links 176. The links 176 maybe wired or wireless or both and may implement, e.g., an X2 interface. Further, as stated above the links 176 may be through other network devices such as, but not limited to an NCE/MME/SGW device such as the NCE/MME/SGW 190 of FIG. 2.

The one or more buses 157 and 187 may be address, data, or control buses, and may include any interconnection mechanism, such as a series of lines on a motherboard or integrated circuit, fiber optics or other optical communication equipment, wireless channels, and the like. For example, the one or more transceivers 160 and/or 190 may be implemented as a remote radio head (RRH) 203 and/or 205, with the other elements of the gNB 170 being physically in a different location from the RRH, and the one or more buses 157 could be implemented in part as fiber optic cable to connect the other elements of the gNB 170 to a RRH.

It is noted that description herein indicates that "cells" perform functions, but it should be clear that the gNB that forms the cell will perform the functions. The cell makes up part of a gNB. That is, there can be multiple cells per gNB.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The gNB 180 is coupled via a link 200 to the NCE 190. Further, the gNB 180 is coupled via links 176 to the gNB 170. The links 131, 176, and/or 200 may be implemented as, e.g., an S1 interface.

The NCE 190 includes one or more processors 175, one or more memories 171, and one or more network interfaces (N/W I/F(s)) 197, interconnected through one or more buses coupled with the link 185. The one or more memories 171 include computer program code 173. The one or more memories 171 and the computer program code 173 are configured to, with the one or more processors 175, cause the NCE 190 to perform one or more operations which may be needed to support the operations in accordance with the example embodiments of the invention.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152, 182, or 175 and memories 155, 195, and 171, and also such virtualized entities create technical effects.

The computer readable memories 125, 155, 171, and 195 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, 171, and 195 may be means for performing storage functions. The processors 125, 155, 171, and 195 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, 175, and 182 may be means for performing functions, such as controlling the UE 110, gNB 170, gNB 180, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Part 1: Introduction of an automatic procedure for building the association of 'peer S-NSSAIs'

An example embodiment of the invention includes introduction of an automatic procedure for building the association between 'peer S-NSSAIs' across different PLMNs or between a PLMN and a type-a network: the procedure consists of bidirectional exchange of the S-NSSAI value and the 'fundamental' slice characteristics between two NG-RAN nodes during Xn setup/configuration update to allow associating with one or multiple peer slice(s) in the respective peer network.

Figure 6:
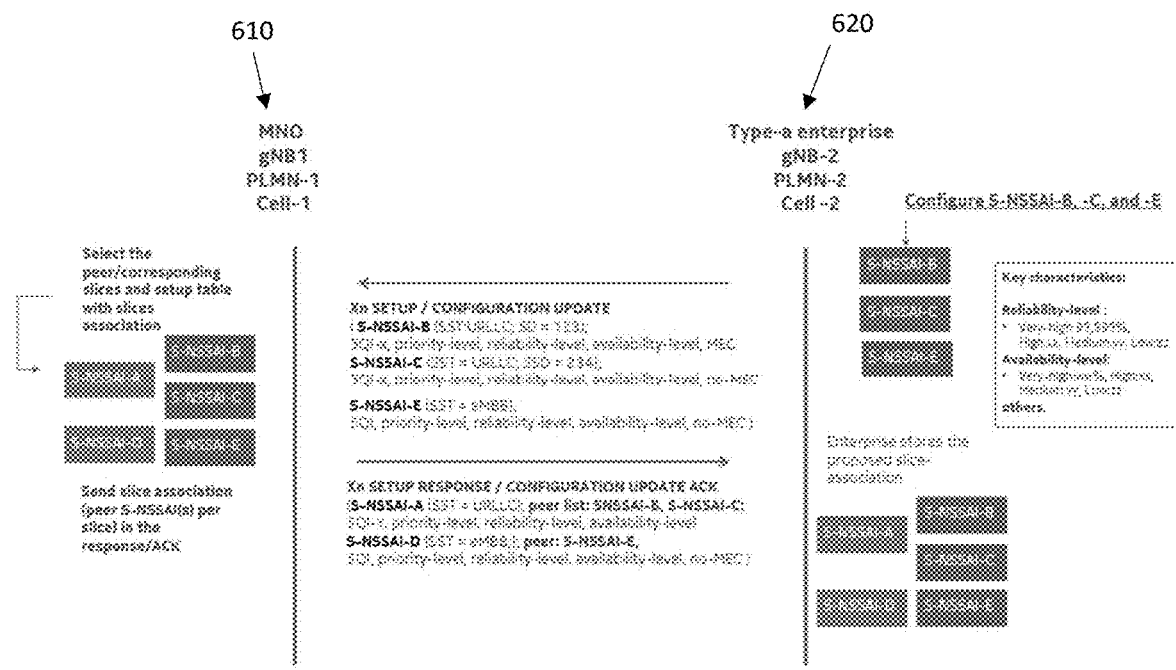
FIG. 6 shows an exchange of 'Peer s-NSSAI' during Xn setup/configuration update.

FIG. 6 shows an exchange of 'Peer S-NSSAI' during Xn setup/configuration update. As shown in FIG. 6 a type-a enterprise gNB-2 620 with a PLMN-2 in a cell-2 has sent an Xn setup/configuration update to an MNO gNB1 610 with a PLMN-1 in a cell-1.

In the example depicted in FIG. 6, S-NSSAI-D (eMBB slice) in PLMN-1 of the MNO is associated with S-NSSAI-E in PLMN-2 (type-a private network) of the enterprise. In a more generic case, a single S-NSSAI can also be associated with multiple (a list of) peer S-NSSAIs, where disambiguation is done using one or several additional parameters (slice characteristics/attributes).

In the example of FIG. 6, S-NSSAI-A of the MNO's PLMN-1 is associated with two slices in the type-a network, namely S-NSSAI-B and S-NSSAI-C (the enterprise operates two URLLC slices). "MEC/no-MEC" is used for disambiguation between S-NSSAI-B and S-NSSAI-C. MEC/no-MEC is an example, other slice characteristics/parameters can be used.

Part 2: Inter-Slice Handover Procedures

Figure 5A:
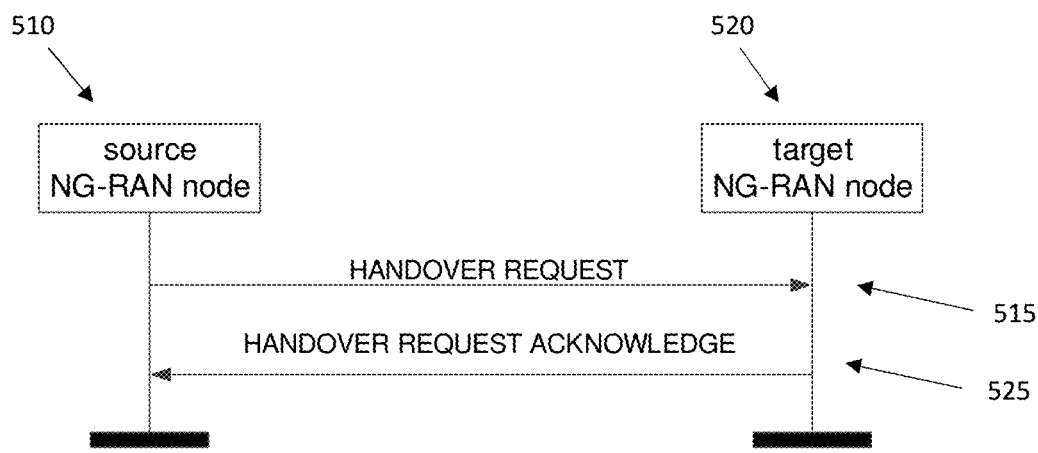
FIG. 5A shows a flow chart of an XnAP-based 'Handover Preparation' procedure.
Figure 5B:
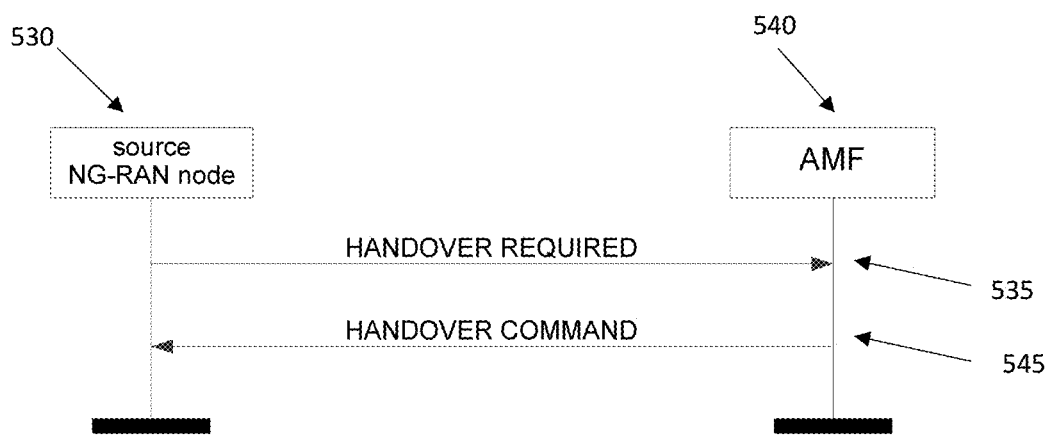
FIG. 5B and FIG. 5C each show a flow chart of an NGAP-based 'Handover Preparation' procedure.
Figure 5C:
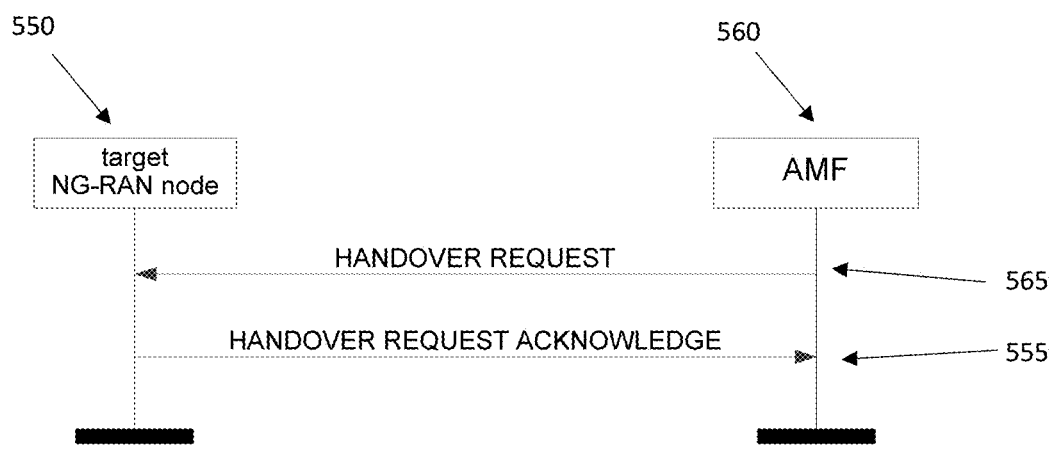

Once the alignment of S-NSSAIs is performed, inter-slice handover can be enabled by modifying:
1) the XnAP-based (i.e., between two NG-RAN nodes) 'Handover Preparation' procedure and the associated IEs in the HANDOVER REQUEST message (cf. FIG. 5A) and/or
2) the NGAP-based (i.e., involving AMF) 'Handover Preparation' procedure (incl. associated IEs in the HANDOVER REQUIRED message, cf. FIG. 5B) and 'Handover Resource Allocation' procedure (incl. associated IEs in the HANDOVER REQUEST message, cf. FIG. 5C)

FIG. 5A shows one successful handover preparation operation. As shown in FIG. 5A there is a handover request 515 from a source NG-RAN node 510 to a target NG-RAN node 520. In response to the handover request 515 there is a handover request acknowledge from the target NG-RAN node 520.

As shown in FIG. 5B there is another successful handover preparation operation. As shown in FIG. 5B there is a handover required 535 from a source NG-RAN node 530 to am AMF node 540. In response to the handover required 535 there is a handover command from the target AMF node 540 to the NG-RAN node 530.

FIG. 5C shows one successful handover resource allocation operation. As shown in FIG. 5C there is a handover request 565 from a source AMF node 560 to a target NG-RAN node 550. In response to the handover request 565 there is a handover request acknowledge 555 from the target NG-RAN node 520.

Part 1: Introduction of an Automatic Procedure for Building the Association of 'Peer S-NSSAIs'

This part introduces the exchange S-NSSAIs and their related fundamental slice characteristics at Xn setup/configuration update: The modified Xn Setup (NG-RAN node Configuration Update, respectively) procedure is shown in FIG. 6.

At Xn setup/configuration update [TS 38.423] (clause 8.4.1), the NG-RAN node 1 sends 'TAI Slice Support List' IE, that is the list of Tracking Area Identities (TAIs) supported by NG-RAN node and associated characteristics e.g. supported slices. 'TAI Slice Support List' IE is included in the 'TAI Support List' IE (cf. FIG. 7), which indicates the list of TAIs supported by NG-RAN node and associated characteristics e.g. supported slices, cf. [TS 38.423], clause 9.2.3.20.

As shown in FIG. 7, 'TAI Support List' specifies for each TAI:
TAC; and
Broadcast PLMNs,
PLMN Identity
TAI Slice Support List: supported S-NSSAIs per tracking area (TA).

Figure 8:
FIG. 8 shows proposed extensions to a 'Slice Support List' IE in accordance with example embodiments of the invention.

Example embodiments of the invention propose enhancements to 'Slice Support List' IE (clause 9.2.3.22 as in FIG. 7) with two new fields, the 'S-NSSAI characteristics' (e.g., supported 5QIs, priority, reliability, and availability level, etc., FIG. 6) and 'List of peer S-NSSAIs' as shown in the last two rows 810 of FIG. 8. These slice characteristics are particularly beneficial for deriving slice associations in case the S-NSSAI contains non-standardized SST values (i.e., values other than MBB, URLLC, and Mlot) or for scenarios where the two involved organizations do not have a common O&M system or two separate O&M systems that do not interact. These are very likely scenarios for private, so-called type-a networks to be operated by, e.g., enterprises.

Consequently, the list of supported S-NSSAIs and the respective peer S-NSSAI(s) in the enterprise network (type-a network) or in the PLMN of a second MNO are indicated for each TAI in 'TAI Support List'.

In a further embodiment (optional), either source or target NG-RAN node can inform AMF about the established (or updated. respectively) 'List of peer S-NSSAIs' using RAN CONFIGURATION UPDATE message, cf. [TS 38.413], clause 8.7.2. For this purpose, the same extended 'Slice Support List' IE listed in FIG. 7 can be re-used in the 'Supported TA List' IE used in the RAN CONFIGURATION UPDATE message.

Once the Xn Setup (or NG-Ran node Configuration Update, respectively) is completed, the two gNBs and possibly the AMF know the peer S-NSSAI(s) of the neighbouring cells.

Part 2: Inter-Slice Handover Procedures

In the following, we discuss the required modifications in the handover procedure, differentiating the two cases outlined in Sec. 5, i.e, XnAP-based inter-slice handover (Case 1) and NGAP-based handover (Case 2).

Case 1) XnAP-Based Inter-Slice Handover

Depending on the implementation, the Handover Request message may contain (cf. [TS 38.423] for the prior art procedure):

1. Source S-NSSAI, i.e., the S-NSSAI included in the handover request message is set to the source gNB's S-NSSAI.

In the example of FIG. 6 the handover request message (gNB1−>gNB2) has the S-NSSAI set to either S-NSSAI-A or S-NSSAI-D. The 'PDU Session Resources To Be Setup Item' IE (contained in the handover request message, cf. [TS 38.423] clause 8.2.1.2) needs to be updated, i.e., current 'S-NSSAI' IE needs to be changed into 'source S-NSSAI'. In an unambiguous slice association case (i.e., S-NSSAI-D→S-NSSAI-E), gNB1 does not need to indicate for gNB2 the peer slice of S-NSSAI-D in the handover request message since gNB2 can derive it from the association table. However, in case of S-NSSAI-A, the gNB2 does not have an unambiguous association, i.e., handover could be to NSSAI-B or NSSAI-C. Without further information regarding the target S-NSSAI in the handover request message, gNB2 needs to apply some internal, implementation-specific logic for deciding between S-NSSAI-B and S-NSSAI-C as target slices. As a result, when gNB1 initiates the handover request of a UE having S-NSSAI A to gNB 2, it can recommend for the target gNB 2 which of the two S-NSSAIs B or C to use for the handed over UE by indicating the peer target S-NSSAI in the handover request message.

2. Both target S-NSSAI and source S-NSSAI are included in HANDOVER REQUEST message.

In the example of FIG. 6 the Handover Request from gNB1→gNB2 has a new added IE: target S-NSSAI that is set to S-NSSAI-B, S-NSSAI-C, or S-NSSAI-E, depending on whether the PDU session belongs to S-NSSAI-A or S-NSSAI-D, respectively. The 'PDU Session Resources To Be Setup Item' IE (contained in the handover request message) needs to be updated, i.e., 'target S-NSSAI' is added as an optional element. As above, if source S-NSSAI equals S-NSSAI-D, target S-NSSAI is already known unambiguously to gNB2 from slice association table. However, in case of S-NSSAI-A, the information (recommendation) on target S-NSSAI by gNB1 can be used by gNB2.

3. As a further embodiment, the automatic association of the peer S-NSSAI may be as well performed during the handover procedure, i.e., slice characteristics are exchanged during the handover preparation procedure (Handover Request and Handover Request Acknowledge messages). For instance, referring to the example of FIG. 6, gNB2 initiating the handover of a UE in slice E can send a Handover Request message to gNB1 containing the slice characteristics of S-NSSAI-E. gNB1 responds by sending Handover Request Acknowledge message to gNB2 containing S-NSSAI-D as peer slice for S-NSSAI-E. Once the association is built, gNB2 may initiate the subsequent handovers without exchanging the slice-characteristics in Handover Request and Handover Request Acknowledge.

The proposed changes of 'PDU Session Resources To Be Setup Item' IE [TS38.423] are indicated in 910 of FIG. 9, two rows below the strikethrough.

Case 2) the NGAP-Based Inter-Slice Handover [TS 38.413]

Herein, we differentiate between two options, depending on whether the AMF is aware of the 'Peer S-NSSAI' as per RAN CONFIGURATION UPDATE message (cf. further embodiment in Part 1)

Option 2a: Modification of both HANDOVER REQUIRED message and HANDOVER REQUEST message.

In this option, the Peer S-NSSAI information has not been provided by NG-RAN node to AMF per RAN CONFIGURATION UPDATE message. Consequently, Peer S-NSSAI information needs to be provided within the modified HANDOVER REQUIRED message ('PDU Session Resource Item' IE), as indicated in 1010 of FIG. 10, the two rows below the strikethrough Further, the proposed changes of the 'PDU Session Resource Setup Item' IE in the HANDOVER REQUEST message are indicated in 1110 of FIG. 11, as by the two rows below the strikethrough.

Option 2b: Modification of HANDOVER REQUEST message only

In this option, it is assumed that the Peer S-NSSAI information has been provided by NG-RAN node to AMF per RAN CONFIGURATION UPDATE message. Consequently, Peer S-NSSAI information may not be provided within the modified HANDOVER REQUIRED message ('PDU Session Resource Item' IE). Using the Peer S-NSSAI information received by NG-RAN node per RAN CONFIGURATION UPDATE message, the AMF can accordingly set source and target S-NSSAI in the PDU Session Resource Setup Item IE of the HANDOVER REQUEST message as indicated in 1110 of FIG. 11, the two rows below the strikethrough.

Figure 12:
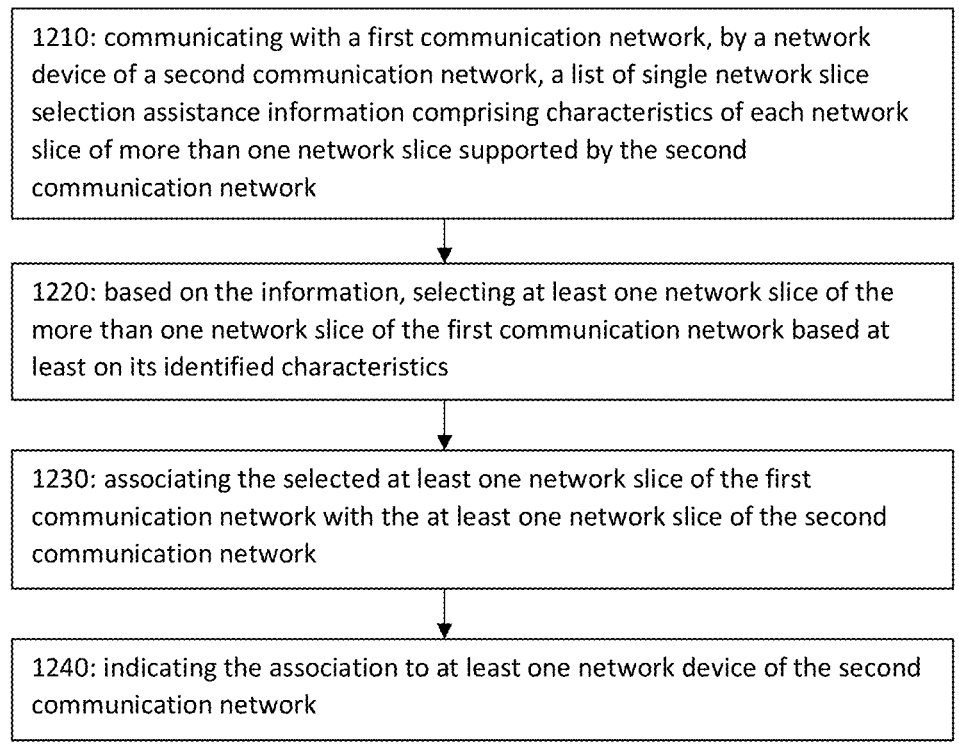
FIG. 12 shows a method in accordance with example embodiments of the invention which may be performed by an apparatus.

FIG. 12 illustrates operations which may be performed by a device such as, but not limited to, a device such as the gNB 170 and/or gNB 180 as in FIG. 2. As shown in step 1210 of FIG. 12 there is communicating with a first communication network, by a network device of a second communication network, a list of single network slice selection assistance information comprising characteristics of each network slice of more than one network slice supported by the second communication network; as shown in step 1220 of FIG. 12 there is based on the information, selecting at least one network slice of the more than one network slice of the first communication network based at least on its identified characteristics; as shown in step 1230 of FIG. 12 there is associating the selected at least one network slice of the first communication network with the at least one network slice of the second communication network; and as shown in step 1240 of FIG. 12 there is indicating the association to at least one network device of the second communication network.

In accordance with the example embodiments as described in the paragraph above, wherein each of the first and second communication networks comprises either a public land mobile network or a private enterprise type-a network.

In accordance with the example embodiments as described in the paragraphs above, wherein the identified characteristics for each of the more than one network slice comprises characteristics of at least one of: 5G quality of service indicator (5QI) or an equivalent QoS indicators of legacy generations; Priority; Supported reliability-level; Supported availability level; and Multi-access edge computing.

In accordance with the example embodiments as described in the paragraphs above, wherein the identified characteristics for each of the more than one network slice comprises characteristics of a level of mobility support.

In accordance with the example embodiments as described in the paragraphs above, wherein the identified characteristics for each of the more than one network slice are acquired from at least one network device that is not part of the first or second communication network.

In accordance with the example embodiments as described in the paragraphs above, wherein the communicating and indicating comprise communicating at least one information element.

In accordance with the example embodiments as described in the paragraphs above, wherein an information element of the at least one information element comprises at least one of 'S-NSSAI characteristics' field and 'List of peer S-NSSAIs' field.

In accordance with the example embodiments as described in the paragraphs above, wherein the associating is performed during the Xn setup or Xn configuration update or XnAP-based handover or NGAP-based handover.

In accordance with the example embodiments as described in the paragraphs above, wherein an information element of the at least one information element is indicating packet data unit sessions which belong to each identified network slice of more than one network slice.

In accordance with the example embodiments as described in the paragraphs above, wherein an information element of the at least one information element is indicating a source single network slice selection assistance information of the more than one network slice of the second communication network for the handover.

In accordance with the example embodiments as described in the paragraphs above, wherein an information element of the at least one information element is indicating a source single network slice selection assistance information of the more than one network slice of the second communication network and a suggested target single network slice selection assistance information of the more than one network slice of the first communication network for the handover.

A non-transitory computer-readable medium (Memory (ies) 155 and/or Memory(ies) 195 as in FIG. 2) storing program code (Computer Program Code 153 and/or Computer Program Code 193 as in FIG. 2), the program code executed by at least one processor (Processor(s) 152 and/or Processors 182 as in FIG. 2) to perform the operations as at least described in the paragraphs above.

In accordance with an example embodiment of the invention as described above there is an apparatus comprising: means for communicating (remote radio head (RRH) 203 and/or 205; Computer Program Code 133 and/or Computer Program Code 193; and Processor(s) 152 and/or Processors 182 as in FIG. 2) with a first communication network, by a network device of a second communication network, a list of single network slice selection assistance information comprising characteristics of each network slice of more than one network slice supported by the second communication network; means, based on the information, for selecting (Computer Program Code 133 and/or Computer Program Code 193; and Processor(s) 152 and/or Processors 182 as in FIG. 2) at least one network slice of the more than one network slice of the first communication network based at least on its identified characteristics; means for associating (remote radio head (RRH) 203 and/or 205; Computer Program Code 133 and/or Computer Program Code 193; and Processor(s) 152 and/or Processors 182 as in FIG. 2) the selected at least one network slice of the first communication network with the at least one network slice of the second communication network; and means for indicating (remote radio head (RRH) 203 and/or 205; Computer Program Code 133 and/or Computer Program Code 193; and Processor(s) 152 and/or Processors 182 as in FIG. 2) the association to at least one network device of the second communication network.

In the example aspect of the invention according to the paragraphs above, wherein at least the means for communicating, selecting, associating, and indicating comprises a non-transitory computer readable medium [Memory(ies) 155 and/or Memory(ies) 195 as in FIG. 2] encoded with a computer program [Computer Program Code 153 and/or Computer Program Code 193; and Duplicate D/R Module 150-1 and/or Duplicate D/R Module 180-1 as in FIG. 2] executable by at least one processor [Processor(s) 152 and/or Processors 182 as in FIG. 2.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   receiving, by a device of a first communication network, a list of single network slice selection assistance information (S-NSSAI), wherein the list of S-NSSAI comprises characteristics of each network slice supported by a second communication network;
   selecting, by the device of the first communication network, at least one network slice of the first communication network based at least on the characteristics;
   associating, by the device of the first communication network, the selected at least one network slice of the first communication network with at least one network slice of the second communication network; and
   indicating the association to a device of the second communication network.

2. The method of claim 1, wherein the characteristics for each network slice comprises characteristics of at least one of: quality of service indicator; priority; supported reliability-level; supported availability level; and multi-access edge computing.

3. The method of claim 1, wherein each of the first and second communication networks comprises either a public land mobile network or a private enterprise network.

4. The method of claim 1, wherein the characteristics of each network slice is received via an S-NSSAI characteristics field.

5. The method of claim 1, wherein the characteristics of each network slice is received in an information element of tracking area identity slice support list.

6. The method of claim 1, further comprising: receiving an association information of at least one network slice of the first communication network with a network slice of the second communication network via a list of peer S-NSSAIs field.

7. The method of claim 1, wherein the associating is performed during an Xn setup or Xn configuration update or XnAP-based handover or NGAP-based handover.

8. The method of claim 1, further comprising: receiving a source S-NSSAI of a network slice of the second communication network in handover request message.

9. The method of claim 1, further comprising: receiving a source S-NSSAI of a network slice of the second communication network and a target S-NSSAI of a network slice of the first communication network in handover request message.

10. An apparatus of a first communication network, comprising:
    at least one processor; and
    at least one memory including computer program code, wherein the at least one memory and the computer program code are configured to, with the at least one processor, cause the apparatus to at least:
    receive a list of single network slice selection assistance information (S-NSSAI), wherein the list of S-NSSAI comprises characteristics of each network slice supported by a second communication network;
    select at least one network slice of the first communication network based at least on the characteristics;
    associate the selected at least one network slice of the first communication network with at least one network slice of the second communication network; and
    indicating the association to a device of the second communication network.

11. The apparatus of claim 10, wherein the characteristics for each network slice comprises characteristics of at least one of: quality of service indicator; priority; supported reliability-level; supported availability level; and multi-access edge computing.

12. The apparatus of claim 10, wherein each of the first and second communication networks comprises either a public land mobile network or a private enterprise network.

13. The apparatus of claim 10, wherein the characteristics of each network slice is received via an S-NSSAI characteristics field.

14. The apparatus of claim 10, wherein the characteristics of each network slice is received in an information element of tracking area identity slice support list.

15. The apparatus of claim 10, wherein the apparatus is further caused to: receive an association information of at least one network slice of the first communication network with a network slice of the second communication network via a list of peer S-NSSAIs field.

16. The apparatus of claim 10, wherein the associating is performed during an Xn setup or Xn configuration update or XnAP-based handover or NGAP-based handover.

17. The apparatus of claim 10, wherein the apparatus is further caused to: receive a source S-NSSAI of a network slice of the second communication network in handover request message.

18. The apparatus of claim 10, wherein the apparatus is further caused to: receive a source S-NSSAI of a network slice of the second communication network and a target S-NSSAI of a network slice of the first communication network in handover request message.

19. An apparatus of a second communication network, comprising:
  at least one processor; and
  at least one memory including computer program code, wherein the at least one memory and the computer program code are configured, with the at least one processor, to cause the apparatus to at least:
  send a list of single network slice selection assistance information (S-NSSAI), wherein the list of S-NSSAI comprises characteristics of each network slice supported by the second communication network; and
  receive an association of at least one network slice of a first communication network with at least one network slice of the second communication network, wherein the at least one network slice of the second communication network is in the list of S-NSSAI sent by the apparatus.

20. The apparatus of claim 19, wherein the characteristics for each network slice comprises characteristics of at least one of: quality of service indicator; priority; supported reliability-level; supported availability level; and multi-access edge computing.

* * * * *